(12) United States Patent
Lefebvre et al.

(10) Patent No.: US 6,618,759 B1
(45) Date of Patent: Sep. 9, 2003

(54) IMMEDIATE MODE COMPUTER GRAPHICS COMMAND CACHING

(75) Inventors: Kevin Lefebvre, Ft Collins, CO (US); John M Brown, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/494,291

(22) Filed: Jan. 31, 2000

(51) Int. Cl.⁷ .............................................. G06F 15/16
(52) U.S. Cl. ..................... 709/235; 709/201; 345/522; 345/748; 345/782
(58) Field of Search ............................... 709/201, 235; 345/748, 782, 522

(56) References Cited

U.S. PATENT DOCUMENTS

| | | | |
|---|---|---|---|
| 5,550,962 A | * | 8/1996 | Nakamura et al. .......... 709/232 |
| 5,561,752 A | * | 10/1996 | Jevans ........................ 345/522 |
| 5,657,479 A | * | 8/1997 | Shaw et al. ................. 345/553 |
| 5,945,992 A | * | 8/1999 | Cunniff ....................... 345/748 |
| 5,966,142 A | * | 10/1999 | Harkin ........................ 345/522 |
| 6,249,294 B1 | * | 6/2001 | Lefebvre et al. ............ 345/504 |
| 6,337,689 B1 | * | 1/2002 | Hochmuth et al. ......... 345/522 |

* cited by examiner

Primary Examiner—Saleh Najjar
(74) Attorney, Agent, or Firm—Kevin M. Hart

(57) ABSTRACT

For networked client-server computer graphics systems, performance is improved by caching immediate mode graphics commands in the server host. Two types of immediate mode command packets are employed—a full-size packet type and a truncated packet type. The full-size packet type includes a cache code field, a table index field and a data field corresponding to the command. The truncated packet type includes only the cache code field and the table index field. For certain outgoing immediate mode commands, if it is determined on the client side that the command's data field has not previously been stored within the server host, then the client host sends a full-size packet type to the server host to indicate the command. The server host executes the command and stores the command's data field in its own memory for possible later use. But if it is determined on the client side that the command's data field has previously been stored within the server host, then the client host sends only a truncated packet type to the server host to indicate the command. In the latter case, the server host executes the command by recalling a previously-stored data field responsive to the table index supplied in the truncated packet.

30 Claims, 5 Drawing Sheets

IMMEDIATE MODE COMPUTER GRAPHICS COMMAND CACHING

FIELD OF THE INVENTION

This invention relates generally to the field of computer graphics. More particularly, the invention relates to performing 3D graphics operations efficiently in a networked environment.

BACKGROUND

OpenGL in Networked Environments. OpenGL is a standard application programmer's interface ("API") to hardware that accelerates 3D graphics operations. OpenGL is intended to be used with window systems such as the X Window System. In order that OpenGL may be used in an X Window System environment, an extension to the X Window System has been developed called GLX. For more complete information on the GLX extension to the X Window System and on how OpenGL can be integrated with the X Window System, see for example Mark K. Kilgard, *OpenGL Programming for the X Window System* (Addison-Wesley Developers Press 1996).

FIG. 1 illustrates a typical prior art implementation wherein single-screen 3D accelerated graphics operations are performed over a network in an X Window System environment. Two computer systems are used. Client host 100 is connected to server host 102 via LAN 104 or some other suitable network or system connection. As can be seen from the drawing, three processes are running on hosts 100 and 102: An OGL/X client process 1806 runs on client host 100. An X server process 108 and an OGL daemon process 110 process run on server host 102. (For more information on this three-process model, see Kevin T. Lefebvre, et al., "An Overview of the HP OpenGL Software Architecture," Hewlett-Packard Journal Vol. 49, No. 2, pp. 9–18 (May 1998), which article is hereby incorporated by reference in its entirety.) X server process 108 is one that includes the GLX extension. Both OGL/X client 106 and OGL daemon 110 have an OpenGL implementation that includes a device independent ("DI") OGL layer 112 and a device dependent ("DD") OGL layer 114.

The purpose of OGL DI layer 112 and OGL DD layer 114 is to execute OpenGL commands and to drive 3D accelerated display hardware 116. OGL DI layer 112 has one set of routines for local rendering and another set of routines for rendering over network 104. The local versus remote modes are initialized by loading pointers to the desired set of routines in a dispatch table in OGL/Xlib dispatch layer 118. Each OGL command that comes from application 120 will point to a particular entry in the dispatch table. By placing a different pointer in that entry, a different routine may be used to implement the OGL command corresponding to that entry. (For a more detailed discussion of this kind of dispatch table indirection, see for example U.S. Pat. No. 5,321,808, titled "Dual Process Display Server," by Lawrence E. Rupp, which patent is hereby incorporated by reference in its entirety.)

In the example of FIG. 1, if the local mode is chosen, then OGL commands issued by application 120 will be rendered directly on the display hardware 116 that is coupled to host 1800. But if the remote mode is chosen, as it would be in a networked environment, then OGL commands issued by application 120 will be routed to X server process 108 using the GLX extension protocol. From there, they are routed to OGL daemon process 110 which executes them and renders the result on the display hardware 116 coupled to server host 102.

Network Bandwidth Conservation. When OpenGL is being used in remote mode in a networked environment such as that shown in FIG. 1, it is common for a great deal of traffic to pass from client host 100 to server host 102 over network connection 104. This is particularly true in single-logical-screen applications wherein a single client host issues commands to numerous server hosts over the network. For this reason, network bandwidth can become an important performance limiter in many applications.

Command Buffering. One technique that has been employed in the past to conserve network bandwidth in this context has been the technique of buffering OpenGL commands within client host 100 before they are transmitted to server host 102. For example, in FIG. 1, outgoing commands are buffered within client-side OGL command buffer 122, which buffer is created and managed by client-side GLX library 123. On the server side, incoming OGL commands are buffered in server-side OGL command buffer 124. GLX extension 125 within X server process 108 creates, manages and fills server-side shared memory OGL command buffer 124. OGL daemon 110 has a shared memory connection to OGL command buffer 124, as shown at 126. It uses shared memory connection 126 to read OGL command buffer 124 so that it can execute the commands stored therein. A direct inter-process connection between OGL daemon 110 and X server process 108 also exists, as shown at 126. Using direct inter-process connection 126, X server process 108 can, for example, communicate to OGL daemon 110 when shared memory OGL command buffer 124 is ready to be read.

A typical server-side process for receiving and consuming command buffers is summarized in the flow diagram of FIG. 2. In step 200, a new command buffer is received in server host 102. Steps 202, 204 and 206 represent a loop wherein a server side process repeatedly extracts commands from the received command buffer one at a time and executes them. When the buffer is completely consumed, a new buffer is received again in step 200.

In higher-end applications requiring very high network bandwidth, multiple command buffers may be employed to further enhance performance. Such a multiple-buffer arrangement is described by Kevin Lefebvre, et al. in U.S. patent application Ser. No. 09/138,456, filed Aug. 21, 1998, titled "3D Graphics in a Single Logical Screen Display Using Multiple Remote Computer Systems," now U.S. Pat. No. 6,249,299, which patent application is hereby incorporated by reference in its entirety.

Creation of Array Function Calls Downstream of the Application. Another technique that has been used to conserve network bandwidth has been the technique of converting vertex function calls issued by application software 120 into array function calls before transmitting them to server host 102. Not only do array function calls conserve network bandwidth relative to vertex function calls, but they also yield faster rendering performance.

FIG. 3 is a flow diagram illustrating this technique according to a method described by Roland Hochmuth, et al. in U.S. patent application Ser. No. 09/302,659, filed Apr. 30, 1999, titled "Adaptive Buffering of Computer Graphics Vertex Commands," now U.S. Pat. No. 6,337,689, which patent application is hereby incorporated by reference in its entirety. Among the OpenGL commands issued by application software 120 are: (1) vertex API commands 300, also known as "VAPI commands," such as glBegin, glVertex and glEnd; (2) glDrawArrays commands 302; and (3) glDrawArraySet commands 304. VAPI command routines 306 are used to buffer the information contained in VAPI commands 300 into data structures that can be used by a glDrawArrays function call. Similarly, glDrawArrays command routines 308 are used to buffer information contained in glDrawArrays commands 302, as well in the structures created by VAPI command routines 308, into data structures that can be used by a glDrawArraySet function call. Finally, glDrawArraySet routines 310 buffer glDrawArraySet function calls into client-side command buffer 122. Periodically, client-side command buffer 122 is flushed to one or more server hosts 102 using network connection 104.

The functionality of VAPI routines 306 is described in more detail by Hochmuth et al., supra, at FIGS. 3–4 therein and in the accompanying text. The functionality of glDrawArrays routines 302 is described in more detail by Hochmuth et al., supra, at FIGS. 5–14 therein and in the accompanying text. The functionality of glDrawArraySet routines 310 is described in more detail in both Hochmuth et al., supra, and in the Lefebvre et al. patent application Ser. No. 09/138,456, supra.

Immediate Mode Versus Display List Mode in OpenGL. OpenGL commands can be issued for immediate execution in what is called "immediate mode." Alternatively, most OpenGL commands can be stored for later execution in what is called "display list mode." Once a series of OpenGL commands has been stored in a display list, the series of commands can be called later for execution by issuing a single command that simply identifies the list. Thus, display list mode represents yet another technique for conserving network bandwidth in an environment like that shown in FIG. 1: The display list itself is stored in server host 104. To execute the commands in the list, client host 100 needs only to transmit a single glCallList command over network 104. That is why, once a display list has been created in server host 104, significant network bandwidth is preserved each time the display list is called. Unfortunately, not all application software uses display list mode.

Objects of the Invention. It is therefore an object of the invention to preserve network bandwidth between a client host and a server host in the context of performing computer graphics operations.

It is a further object of the invention to preserve network bandwidth between a client host and a server host when application software in the client host issues OpenGL commands in immediate mode.

SUMMARY OF THE INVENTION

For environments in which immediate mode graphics commands are sent by a client host across a network for execution by a server host, the invention improves performance by caching immediate mode commands inside the server host. It is believed that the invention will yield the highest benefits when used with applications that frequently re-send data.

In an embodiment, two types of immediate mode command packets are employed—a full-size packet type and a truncated packet type. The full-size packet type includes a cache code field, a table index field and a data field corresponding to the command. The truncated packet type includes only the cache code field and the table index field. For certain outgoing immediate mode commands, if it is determined on the client side that the command's data field has not previously been stored within the server host, then the client host sends a full-size packet type to the server host to indicate the command. The server host executes the command and stores the command's data field in its own memory for possible later use. But if it is determined on the client side that the command's data field has previously been stored within the server host, then the client host sends only a truncated packet type to the server host to indicate the command. In the latter case, the server host executes the command by recalling a previously-stored data field responsive to the table index supplied in the truncated packet.

DETAILED DESCRIPTION OF THE PREFERRED EMBODIMENTS

Figure 1:
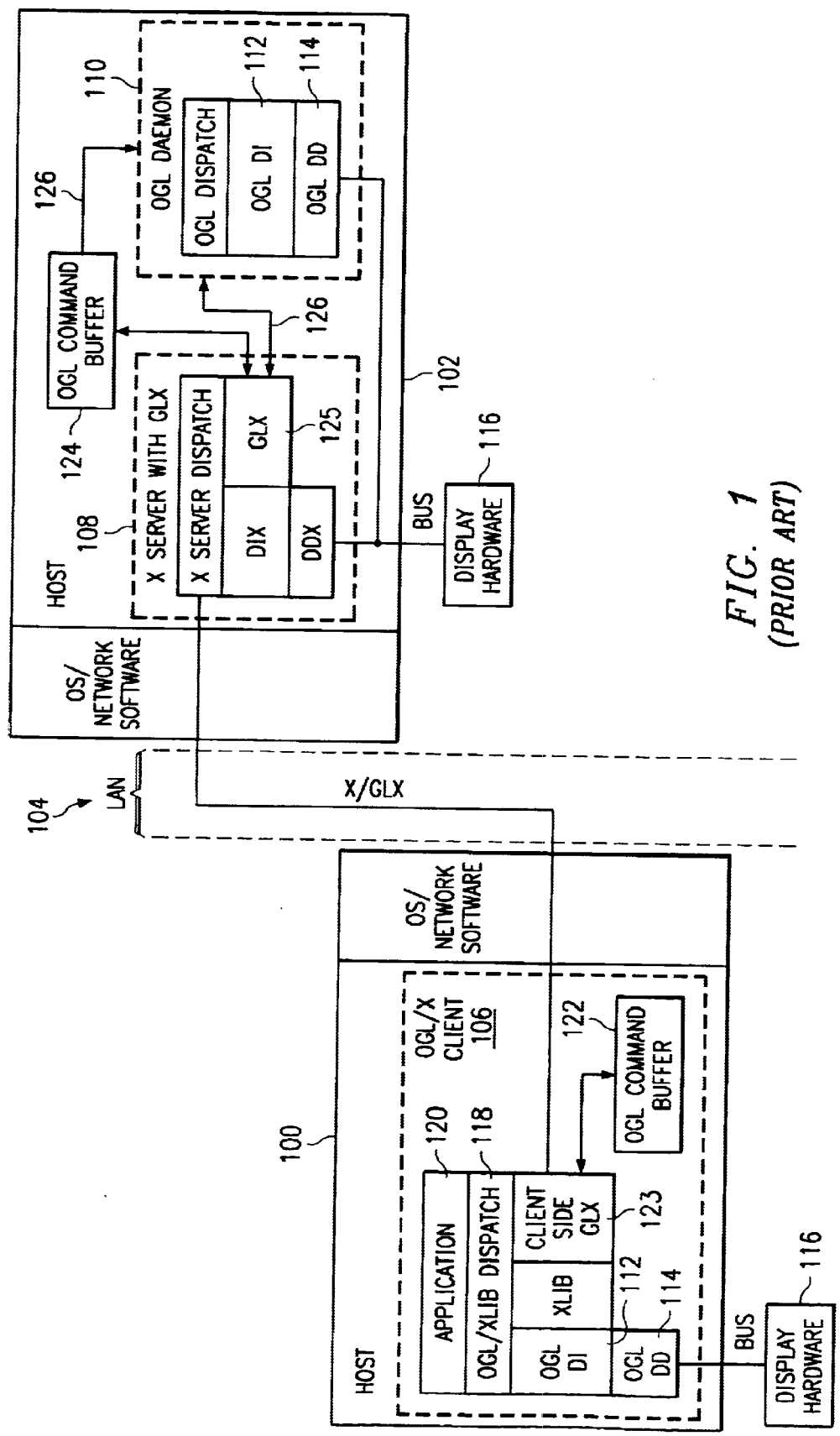
FIG. 1 is a block diagram illustrating a computer system configured to perform 3D accelerated graphics operations over a network in an X Window System environment according to the prior art.
Figure 2:
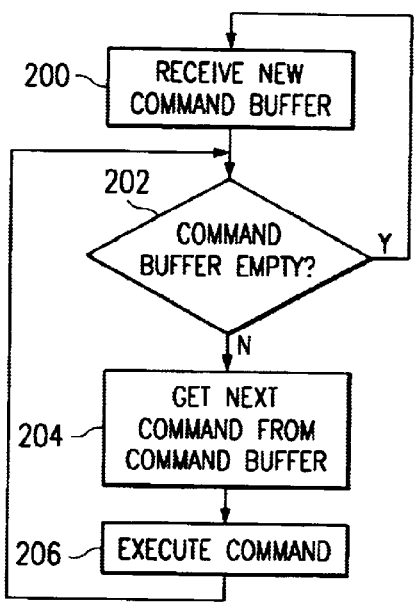
FIG. 2 is a flow diagram illustrating a prior art server-side process for receiving and executing buffered commands in the environment of FIG. 1.
Figure 4:
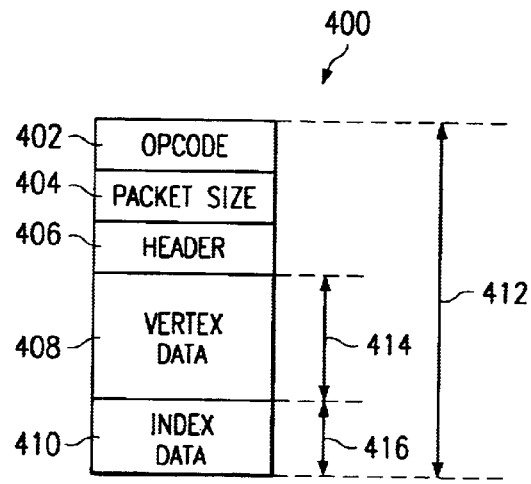
FIG. 4 is a block diagram illustrating a prior art glDrawArraySet command packet.
Figure 3:
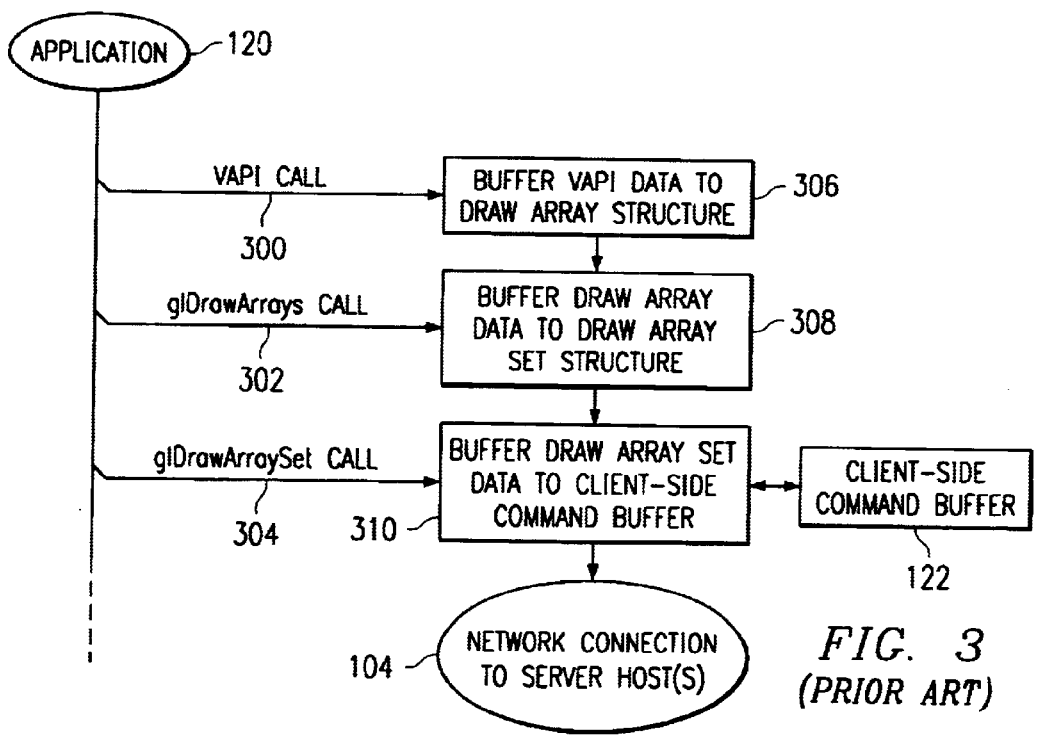
FIG. 3 is a flow diagram illustrating a prior art client-side technique for creating OpenGL array function calls downstream of application software in the environment of FIG. 1.

Command Packets. FIG. 4 illustrates a prior art immediate mode graphics command packet 400 that was used with the system described above with reference to FIGS. 1–3. Packet 400 includes an opcode field 402, a packet size field 404, a header field 406, a vertex data field 408 and an index data field 410. Opcode field 402 would contain, for example, the opcode corresponding to a glDrawArraySet command. Packet size field 404 would indicate the total size 412 of command packet 400. If command packet 400 were being used to indicate a glDrawArraySet command (as it normally would be), then vertex data field 408 would contain information such as vertex coordinates, colors and normal values corresponding to a plurality of polygon vertices. Index data field 410 would contain an array of indexes to be used by the glDrawArraySet routine for delimiting the information contained within data field 408. Header field 406 would contain information such as: the size 414 of vertex data field 408; the size 416 of index data field 410; the vertex format represented by the data in vertex data field 408 (for example, the number of vertices per polygon); the primitive type represented by the data in vertex data field 408 (for example, triangles); and any other information required by the server-side process for determining which parameters should be used to create a glDrawArraySet call based on data fields 408 and 410.

Figure 5:
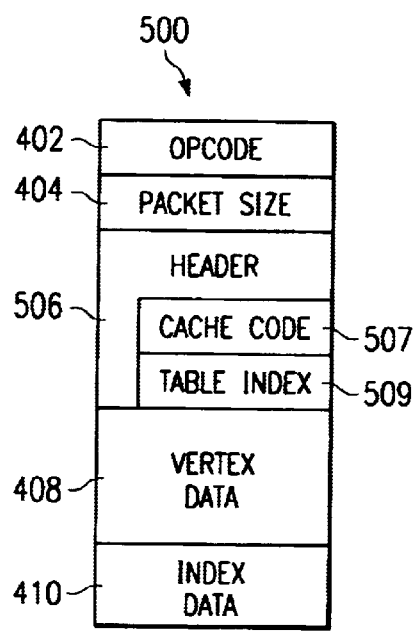
FIG. 5 is a block diagram illustrating a full-size glDrawArraySet command packet according to a preferred embodiment of the invention.
Figure 6:
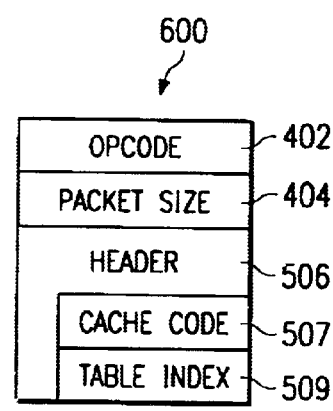
FIG. 6 is a block diagram illustrating a truncated glDrawArraySet command packet according to a preferred embodiment of the invention.
Figure 7:
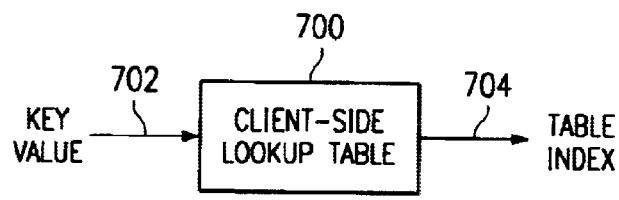
FIG. 7 is a block diagram schematically illustrating a client-side lookup table according to a preferred embodiment of the invention.
Figure 8:
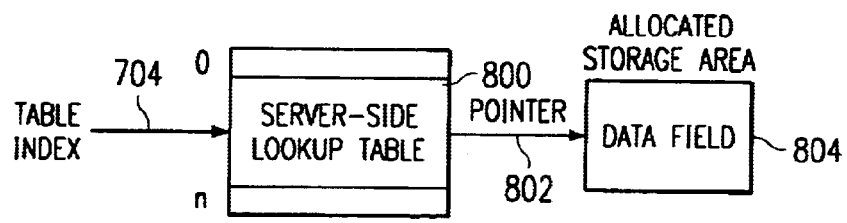
FIG. 8 is a block diagram schematically illustrating a server-side lookup table according to a preferred embodiment of the invention.

FIGS. 5 and 6 illustrate modified types of immediate mode graphics command packets according to a preferred embodiment of the invention. Full-size packet 500 includes all of the fields that were included in prior art packet 400, but header field 506 has been augmented relative to prior art header field 406: Header field 506 includes a new cache code field 507 and a new table index field 509. Truncated packet 600 is identical to full-size packet 500 except that vertex data field 408 and index data field 410 are omitted.

Method Overview. In general, the invention may be used to improve performance any time immediate mode graphics commands are sent by a client host across a network for execution by a server host. In the client host, a determination is made whether a data field (such as data fields 408 and 410) corresponding to an immediate mode command (such as a glDrawArraySet command) has previously been stored within the server host. If it is determined that the data field has not previously been so stored, then the client host sends a full-size packet 500 to the server host to indicate the command. But if it is determined that the data field has been previously so stored, then the client host sends a truncated packet to the server host to indicate the command.

When a full-size packet 500 is received by the server host, the server host extracts the data field (typically both of data fields 408 and 410) from the packet and stores them in server host memory for possible later use. The server host also executes the immediate mode command indicated in opcode field 402 (typically a glDrawArraySet command). When a truncated packet 600 is received by the server host, the server host extracts a table index from table index field 509. The server host then accesses a data field stored in server host memory (such as a previously-stored copy of vertex data field 408 and index data field 410) responsive to the table index. The server host then executes the immediate mode command indicated in opcode field 402 using the accessed data field.

An Implementation. An example implementation of the invention will now be described with reference to FIGS. 7–10. In order for client host 100 to know whether a particular data field has been previously stored within server host 102, a client-side table 700 may be maintained in client host memory. In order for server host 102 to be able to retrieve previously-stored data fields for use during command execution, a server-side table 800 may be maintained in server host memory. During initialization, a maximum size is determined for the size of server-side table 800. In the embodiment shown, server-side table 800 would be capable of holding up to "n" entries. The maximum number of entries in server-side table 800 determines the maximum number of data fields that can be cached within server host 102.

Client-side table 700 may be any structure suitable for associating key values 702 with table indexes 704, as shown. In a preferred embodiment, client-side table 700 was implemented using a hash table wherein each bucket contained a linked list of entries. Each of the linked list entries was capable of containing at least a key value and a table index. In a preferred embodiment, each entry also contained two identifier values determined based on the content of the data fields corresponding to a particular immediate mode graphics command. (The nature and use of these identifier values will be further discussed below with reference to FIG. 10.)

Server-side table 800 may be any structure suitable for associating table indexes 704 with stored data fields 804. In a preferred embodiment, server-side table 800 was implemented using an array of pointers 802. Each time it was necessary to store a data field within server memory for possible later use, a storage area was allocated in the server heap to store the data field, and a pointer 802 to the allocated area was placed in array 800. A table index 704 was used as an index into array 800.

Figure 9:
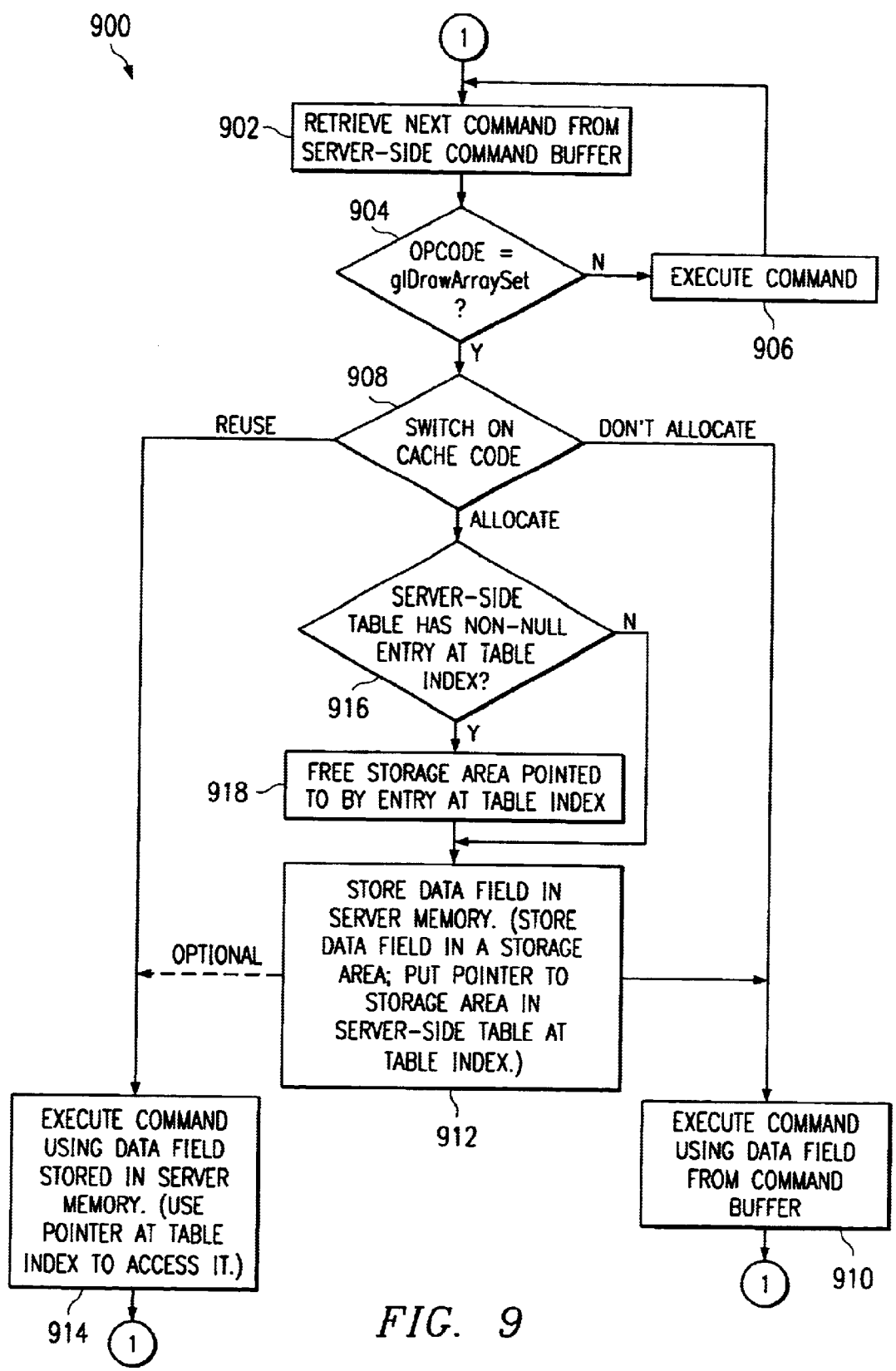
FIG. 9 is a flow diagram illustrating a server-side process for caching immediate mode graphics commands according to a preferred embodiment of the invention.

FIG. 9 illustrates a server-side process 900 suitable for caching immediate mode graphics commands according to a preferred embodiment of the invention. In step 902, a command packet is retrieved from server-side command buffer 124. In step 904, the opcode of the command packet is examined. If the command is not a glDrawArraySet command (or another immediate mode command suitable for caching), then the command is executed in step 906 and operation continues with step 902. But if the command is a glDrawArraySet command or another immediate mode command suitable for caching, then operation continues at step 908, wherein the cache code field 507 of the command packet is examined. In the illustrated embodiment, cache code field 507 was capable of indicating three different directives: Allocate, Don't Allocate, and Reuse. The Don't Allocate directive was used when no immediate mode command caching was desired. But when immediate mode command caching was desired, the Allocate and Reuse directives were used in a manner that will become more clear in the discussion that follows.

If cache code field 507 indicates Don't Allocate, then operation continues with step 910. In step 910, the immediate mode command indicated by opcode field 402 is executed using the data fields 408 and 410 that were included in the command packet received in step 902. (These fields will have been stored in server-side command buffer 124 and can be retrieved therefrom.) Operation then resumes at step 902.

If cache code field 507 indicates Allocate, then operation continues with step 916. In step 916, server-side table 800 is consulted to determine whether a non-null entry appears at the index corresponding to table index field 509 of the command packet. If so, then the storage area pointed to by the entry is freed in step 918, operation continues at step 912. In step 912, a new storage area is allocated and a pointer to the newly allocated area is placed in the table at the table index indicated by field 509 of the command packet. Then, data fields 408 and 410 from the command packet are stored in the newly allocated storage area for possible later use. After this has been done, the immediate mode command indicated by opcode field 402 is executed. This may be done either by using data fields 408 and 410 from command buffer 124 as shown in step 910, or by using the just-stored copies of data fields 408 and 410 from the newly allocated storage area as shown in step 914.

If cache code field 507 indicates Reuse, then operation continues with step 914. In step 914, the contents of table index field 509 are used as the table index into table 800. The pointer associated with the table index is used to access a previously-stored copy of data fields 408 and 410. The accessed copy is then used to execute the immediate mode command indicated by opcode field 402. Operation then resumes at step 902.

Figure 10:
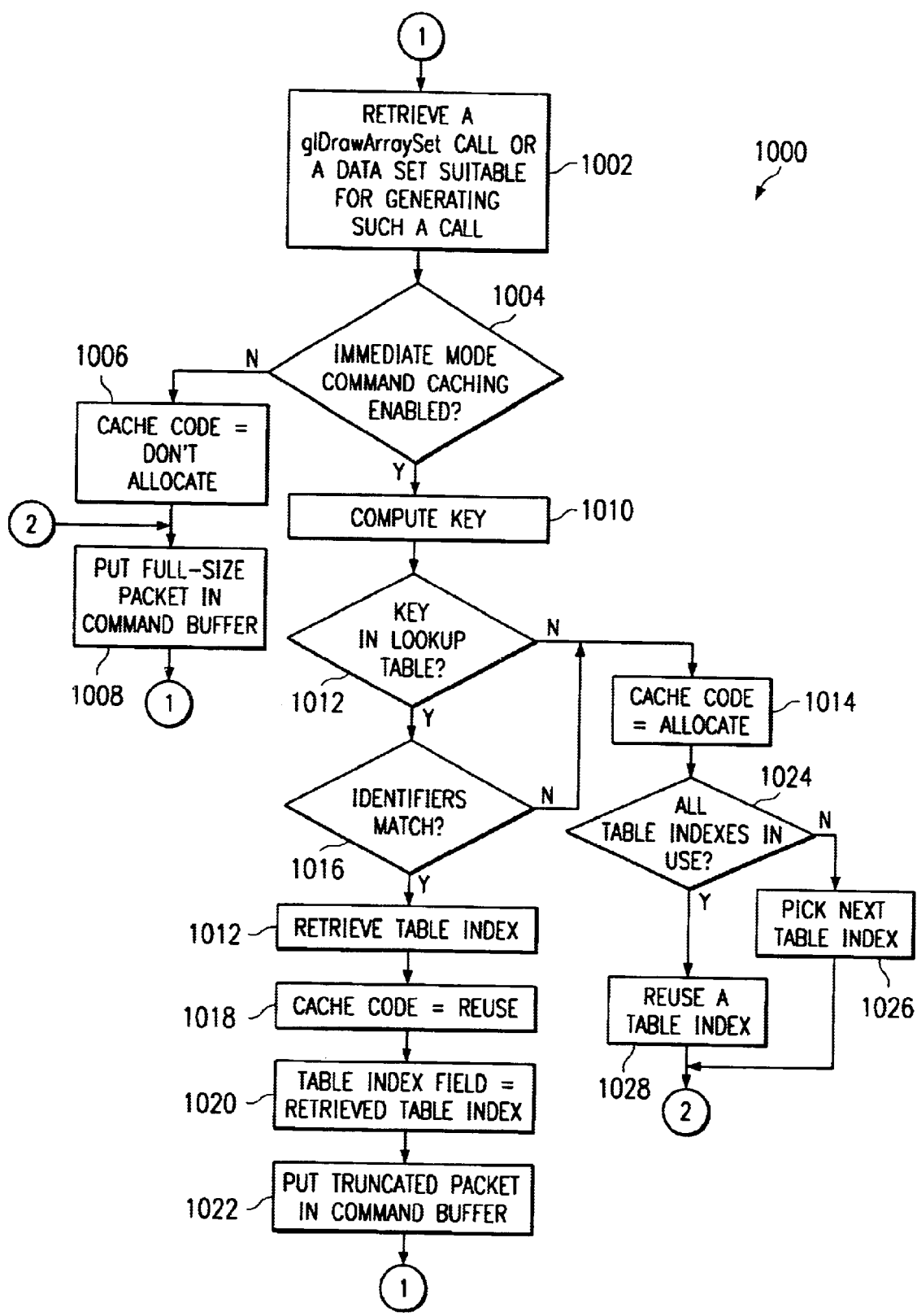
FIG. 10 is a flow diagram illustrating a client-side process for caching immediate mode graphics commands according to a preferred embodiment of the invention.

FIG. 10 illustrates a server-side process 1000 suitable for caching immediate mode graphics commands according to a preferred embodiment of the invention. The functionality represented by FIG. 10 would typically be added to that represented by block 310 of FIG. 3. In step 1002, a glDrawArraySet or similar function call is received (or a data set suitable for generating such a function call). In step 1004, an environment variable is consulted to determine whether immediate mode command caching is desired. If not, then the cache code field 507 of a full-size command packet 500 is set to Don't Allocate in step 1006 and the other fields of the packet 500 are filled in appropriately. In step 1008, the packet 500 is sent to (or otherwise becomes a part of) client-side command buffer 122. Operation then resumes at step 1002.

If it is determined in step 1004 that immediate mode command caching is desired, then operation continues at step 1010. In step 1010, a key value 702 is computed based on at least a portion of data fields 408 and 410 corresponding to the immediate mode command received in step 1002. Numerous methods may be used to calculate such a key value suitably. In a preferred embodiment, key value 702 was computed as the checksum of combined data fields 408 and 410 (treating each value therein as an unsigned integer and adding them).

Before discussing step 1012, it will be useful to describe table 700 in more detail: Recall from the discussion above that, in a preferred embodiment, table 700 was implemented as a hash table. Recall also that at least one identifier value was stored in each linked list entry of the hash table. In an embodiment, it was decided to store in each such entry the size 414 of the corresponding vertex data field 408 as a first identifier value, and to store the size 416 of the corresponding index data field 410 as a second identifier value. In step 1012, table 700 is searched for the target key value that was computed based on the command received in step 1002. If the target key value is not found in the table, then operation continues at step 1014 (to be further discussed below). But if the target key value is found in the table, then first and second identifier values are determined based on the command received in step 1002. In step 1016, those identifier values are compared with the identifier values stored in table 700 in association with the target key value. If the identifier values do not match, then operation continues at step 1014. But if the values do match, then it is assumed that the command received in step 1002 is identical to one that has already been cached within server host 102. The table index stored in the matching linked list entry is therefore retrieved from table 700 in step 1012.

In step 1018, the cache code field 507 of a truncated command packet 600 is set to Reuse. In step 1020, the table index retrieved from table 700 is stored in table index field 509 of the truncated command packet 600, and the other fields of packet 600 are filled in appropriately. In step 1022, truncated command packet 600 is sent to (or otherwise becomes a part of) client-side command buffer 122. Operation resumes at step 1002.

If it is determined in step 1012 that the target key value does not occur in table 700, or if a match is not detected in step 1016, then it is assumed that the immediate mode command received in step 1002 is not cached within server host 102. Therefore, in step 1014, the cache code field 507 of a full-size packet 500 is set to Allocate. A table index must then be selected for placement into table index field 509 of the full-size packet 500. In order to select such a table index, a determination is made in step 1024 whether all of the possible table index values corresponding to entries 0 to n of table 800 are already in use. If not, then the table index selected may simply be the next unused table index, as shown in step 1026. But if it is determined in step 1024 that all n table indexes are in use, then in step 1028 one of the table indexes currently in use must be selected for reuse according to a replacement algorithm. Any suitable replacement algorithm may be used for this purpose. In a preferred embodiment, a least-recently-used algorithm was employed. Specifically, a priority queue was created. Each time a match was found in table 700 in step 1016, an indication of the matching entry was moved to the front of the priority queue. Very specifically, the priority queue was implemented as a linked list that was interposed onto the other linked lists belonging to the hash table.

While the invention has been described in detail in relation to preferred embodiments thereof, the described embodiments have been presented by way of example and not by way of limitation. It will be understood by those skilled in the art that various changes may be made in the form and details described above without deviating from the spirit and scope of the invention as defined by the appended claims.

We claim:

1. A method of improving performance when immediate mode graphics commands are sent by a client host across a network for execution by a server host, the method comprising the steps of:

in the client host, determining whether a data field corresponding to an immediate mode command has previously been stored within the server host;

if it is determined that the data field has not previously been so stored, sending a full-size packet to the server host to indicate the command wherein the full-size packet includes the data field; but if it is determined that the data field has been previously so stored, sending a truncated packet to the server host to indicate the command wherein the truncated packet does not include the data field.

2. The method of claim 1, further comprising the steps of:

in the server host, extracting the data field from the full-size packet;

storing the extracted data field in server host memory for possible later use; and executing the immediate mode command.

3. The method of claim 1, further comprising the steps of:

in the server host, extracting a table index from the truncated packet;

accessing the data field in server host memory responsive to the table index; and executing the immediate mode command using the accessed data field.

4. The method of claim 2, further comprising the steps of:

in the server host, extracting a table index from the full-size packet; and wherein the step of storing the extracted data field in server host memory is performed responsive to the table index.

5. The method of claim 1, further comprising the step of:

in the client host, calculating a key value responsive to at least a portion of the data field; and wherein the determining step comprises searching for the key value in a client host memory table.

6. The method of claim 5, wherein:

the step of calculating a key value comprises calculating a checksum on at least a portion of the data field.

7. The method of claim 5, further comprising the steps of:

if the key value is not found in the client host memory table, associating the key value in the client host memory table with an index value and including the index value in the full-size packet.

8. The method of claim 7, further comprising the steps of:

generating an identifier value responsive to at least one portion of the data field; and associating the identifier value with the key value in the client host memory table.

9. The method of claim 8, wherein the identifier value corresponds to the size of the at least one portion of the data field.

10. The method of claim 7, further comprising the steps of:

generating a first identifier value responsive to a first portion of the data field;

generating a second identifier value responsive to a second portion of the data field; and associating both of the first and second identifier values with the key value in the client host memory table.

11. The method of claim 10, wherein the first identifier value corresponds to the size of the first portion of the data field and the second identifier value corresponds to the size of the second portion of the data field.

12. The method of claim 5, further comprising the steps of:

if the key value is found in the client host memory table, comparing a stored identifier value from the client host memory table with an identifier value generated responsive to at least one portion of the data field.

13. The method of claim 12, wherein the identifier value generated responsive to at least one portion of the data field corresponds to the size of the at least one portion of the data field.

14. The method of claim 5, further comprising the steps of:

if the key value is found in the client host memory table, comparing first and second stored identifier values from the client host memory table with first and second generated identifier values, the first and second generated identifier values having been generated responsive to first and second portions of the data field.

15. The method of claim 14, wherein the first generated identifier value corresponds to the size of the first portion of the data field and the second generated identifier value corresponds to the size of the second portion of the data field.

16. A machine-readable storage or transmission medium containing code which, when executed by a computer or computers, causes the computer or computers to perform a method comprising the steps of:

in a client host, determining whether a data field corresponding to an immediate mode command has previously been stored within a server host;

if it is determined that the data field has not previously been so stored, sending a full-size packet to the server host to indicate the command wherein the full-size packet includes the data field; but if it is determined that the data field has been previously so stored, sending a truncated packet to the server host to indicate the command wherein the truncated packet does not include the data field.

17. The medium of claim 16, wherein the method further comprises the steps of:

in the server host, extracting the data field from the full-size packet;

storing the extracted data field in server host memory for possible later use; and executing the immediate mode command.

18. The medium of claim 16, wherein the method further comprises the steps of:

in the server host, extracting a table index from the truncated packet;

accessing the data field in server host memory responsive to the table index; and executing the immediate mode command using the accessed data field.

19. The medium of claim 17, wherein the method further comprises the steps of:

in the server host, extracting a table index from the full-size packet; and wherein the step of storing the extracted data field in server host memory is performed responsive to the table index.

20. The medium of claim 16, wherein the method further comprises the steps of:

in the client host, calculating a key value responsive to at least a portion of the data field; and wherein the determining step comprises searching for the key value in a client host memory table.

21. The medium of claim 20, wherein the method further comprises the steps of:

the step of calculating a key value comprises calculating a checksum on at least a portion of the data field.

22. The medium of claim 20, wherein the method further comprises the steps of:

if the key value is not found in the client host memory table, associating the key value in the client host memory table with an index value and including the index value in the full-size packet.

23. The medium of claim 22, wherein the method further comprises the steps of:

generating an identifier value responsive to at least one portion of the data field; and associating the identifier value with the key value in the client host memory table.

24. The medium of claim 23, wherein the identifier value corresponds to the size of the at least one portion of the data field.

25. The medium of claim 22, wherein the method further comprises the steps of:

generating a first identifier value responsive to a first portion of the data field;

generating a second identifier value responsive to a second portion of the data field; and associating both of the first and second identifier values with the key value in the client host memory table.

26. The medium of claim 25, wherein the first identifier value corresponds to the size of the first portion of the data field and the second identifier value corresponds to the size of the second portion of the data field.

27. The medium of claim 20, wherein the method further comprises the steps of:

if the key value is found in the client host memory table, comparing a stored identifier value from the client host memory table with an identifier value generated responsive to at least one portion of the data field.

28. The medium of claim 27, wherein the identifier value generated responsive to at least one portion of the data field corresponds to the size of the at least one portion of the data field.

29. The medium of claim 20, wherein the method further comprises the steps of:

if the key value is found in the client host memory table, comparing first and second stored identifier values from the client host memory table with first and second generated identifier values, the first and second generated identifier values having been generated responsive to first and second portions of the data field.

30. The medium of claim 29, wherein the first generated identifier value corresponds to the size of the first portion of the data field and the second generated identifier value corresponds to the size of the second portion of the data field.

* * * * *